United States Patent
Giertz

(10) Patent No.: US 11,401,915 B2
(45) Date of Patent: Aug. 2, 2022

(54) METHOD OF CONTROLLING A WIND TURBINE AND APPARATUS THEREFOR

(71) Applicant: Wobben Properties GmbH, Aurich (DE)

(72) Inventor: Helge Giertz, Leer (DE)

(73) Assignee: Wobben Properties GmbH, Aurich (DE)

( * ) Notice: Subject to any disclaimer, the term of this patent is extended or adjusted under 35 U.S.C. 154(b) by 167 days.

(21) Appl. No.: 17/015,919

(22) Filed: Sep. 9, 2020

(65) Prior Publication Data

US 2021/0071637 A1 Mar. 11, 2021

(30) Foreign Application Priority Data

Sep. 11, 2019 (DE) .......................... 102019124400.5

(51) Int. Cl.
F03D 7/02 (2006.01)
F03D 7/04 (2006.01)

(52) U.S. Cl.
CPC ........... *F03D 7/0264* (2013.01); *F03D 7/048* (2013.01); *F05B 2270/107* (2013.01)

(58) Field of Classification Search
CPC ... F03D 7/0264; F03D 7/048; F05B 2270/107
See application file for complete search history.

(56) References Cited

U.S. PATENT DOCUMENTS

| 9,091,245 | B2 * | 7/2015 | Lobato Pena | F03D 9/25 |
| 9,784,241 | B2 * | 10/2017 | Blom | F03D 7/0224 |
| 2012/0243416 | A1 | 9/2012 | Hussain et al. | |

(Continued)

FOREIGN PATENT DOCUMENTS

| CN | 108832720 A | 11/2018 |
| DE | 102015005252 A1 | 10/2016 |

(Continued)

OTHER PUBLICATIONS

Goldschmidt et al., "Cloud-Based Control: A Multi-Tenant, Horizontally Scalable Soft-PLC", 2015 IEEE 8th International Conference on Cloud Computing, pp. 909-916.

(Continued)

*Primary Examiner* — Michael L Sehn
(74) *Attorney, Agent, or Firm* — Seed IP Law Group LLP

(57) ABSTRACT

Provided is a method of controlling a wind turbine. According to the method, a control command for the wind turbine or another wind turbine is received and detected to conflict with at least one stored control command. In addition, a priority and a reception time of the received control command is detected and the received conflicting control command is stored in a memory with the priority and the reception time as a stored control command. In addition, a sequence of the stored conflicted control commands is created or updated based on the priorities and the reception times of the stored conflicted control commands and the stored control command with the highest priority and the oldest reception time is executed as the currently executed control command. Provided is a computer program and an apparatus for carrying out the method and a system including the apparatus.

16 Claims, 4 Drawing Sheets

(56) References Cited

U.S. PATENT DOCUMENTS

2013/0272844 A1  10/2013  Lobato Peña et al.
2018/0349445 A1  12/2018  Ramos et al.

FOREIGN PATENT DOCUMENTS

EP        3382982 A1    10/2018
WO    2019/030133 A1     2/2019

OTHER PUBLICATIONS

Sedgewick et al., "OrderedArrayMaxPQ.java", Oct. 20, 2017, accessed at https://algs4.cs.princeton.edU/2 4pq/OrderedArrayMaxPQ.java.html, 2 pages.
Sedgewick et al., Chapter 2.4 Priority Queues, *Algorithms* (Fourth Edition), Dec. 29, 2017, accessed at https://algs4.cs.princeton.edU/24pq/, 15 pages.
Wikipedia, "Priority queue", Jun. 9, 2019, accessed at https://en.wikipedia.org/w/index.php?title=Priority_queue&oldid=901_114442, 9 pages.

* cited by examiner

METHOD OF CONTROLLING A WIND TURBINE AND APPARATUS THEREFOR

BACKGROUND

Technical Field

The invention concerns the field of wind turbines and in that respect in particular control of the wind turbines.

Description of the Related Art

Hitherto individual wind turbines were substantially controlled by a controller (control means) which is present in the wind turbine and which for example autonomously detects the prevailing wind conditions and controls operation of the wind turbine in dependence on those wind conditions. In the case of a wind farm those control tasks were in part also exclusively handed over to wind farm controllers which, in addition to the control means still provided in the individual wind turbines, provided for joint control of individual wind turbines in the wind farm.

To an increasing extent however operational management tasks are becoming more and more important. That results on the one hand from planning permission conditions but on the other hand also from energy and marketing regulations. In accordance therewith access for controlling the wind turbines, in particular stopping and starting various different external controllers (control devices) disposed outside a wind farm had to be made possible. Those operational management tasks are in part increasingly performed in automated fashion by independent control devices in order in that way to comply with the specified requirements. In addition it is increasingly required that multi-client capable systems are provided, with which it is possible to ensure individual prioritization of control actions.

In that respect the problem is that wind turbines and wind farms are nowadays usually equipped with an SCADA system and SCADA communication which is standardized at least by the wind turbine manufacturer. SCADA is the abbreviation for supervisory control and data acquisition and describes computer systems for open-loop and closed-loop control of installations, here the wind turbine or the wind turbines of a wind farm. That SCADA system is to be considered as an open-loop and closed-loop control system which is individually adapted to the tasks involved and which for example can transmit control commands received in dependence on access rights to the wind turbines. As the SCADA system is a system adapted to functions of the overall system and the fulfillment of operational management tasks was not yet necessary in earlier times existing SCADA systems are hitherto generally not implemented with an operational management software. Nonetheless existing SCADA systems are nowadays already being used for meeting the specified demands for operational management functions whereby operating situations involving conflict increasingly frequently occur.

In general a multi-client capable operational management software is admittedly known from the field of conventional power plants, which allows individual prioritization of control commands. Each power plant is generally equipped with an individually set and managed operational management software. Such operational management software made it possible to avoid the above-mentioned problems of conflicting modes of operation, in particular due to conflicting control commands, by prioritization and synchronization with other instances also in the field of wind turbines.

Introducing such operational management software in wind farms which are already equipped with an existing SCADA system is however generally not possible by virtue of the prevailing hardware and software configuration of the existing system. Accordingly an existing SCADA system would also be overtaxed by a control action performed in the context of an operational management software, with individually independent, partially conflicting control commands.

Overall therefore it is not possible to guarantee satisfactory function with different control systems operated in parallel relationship by means of existing SCADA systems. Faultless and in particular efficient operation of the existing system in which the specified operational management tasks can be simultaneously performed is accordingly not possible and can be made attainable only with major structural changes to the systems.

BRIEF SUMMARY

Provided is a method and an apparatus for controlling at least one wind turbine, with which operational management tasks in wind farms can be provided without significant enlargement of the existing hardware and software in order in particular to avoid conflicting operation of individual wind turbines or wind farms.

The disclosure includes a method of controlling at least one wind turbine. The method firstly includes receiving a control command for the or one of the wind turbines. The method then further detects that the received control command conflicts with at least one control command stored in a memory. Thereupon a priority associated with the received control command and a reception time of the received control command are detected and the received control command is stored in the memory with the associated priority and the reception time. In addition a sequence of the stored conflicting control commands is produced or updated in dependence on the associated priorities and reception times. Thereupon the control command with the highest priority and the oldest reception time is performed as the currently performed control command and the or the other further conflicting stored control command or commands is stored for later implementation.

Accordingly a control command for a wind turbine is received and it is detected that said received control command conflicts with an already stored control command. Accordingly for example one or more control commands which conflict with the received control command are already stored. A priority and a reception time are respectively associated with each of the control commands, namely the received control command and also the already stored control commands. According to the method then besides the control command or commands which are already stored and which are stored with their priority and their reception time, the received control command which clashes with the stored control commands is also stored together with its priority and its reception time.

According to the method there is preferably a list or table in the memory, which includes at least two control commands, with each of which is associated a priority and a reception time. A control command together with its priority and its reception time can also be referred to as an element. A list with two elements, that is to say two control commands with associated priorities and reception times preferably occurs by generation of such a list after reception of a control command which conflicts with a single stored control command. If there is already a list as a plurality of stored control commands were already received and stored, which conflict with each other, the received control command is stored, in particular as a new element, in the list. In that situation in a further step that list is updated in regard to the sequence of the memory commands, in particular elements, that is to say the control commands are sorted. In that case the control commands are sorted in dependence on their priority and in dependence on their reception time.

In addition after the sorting operation, that is to say after updating or generation of the sequence of the control commands, the control command with the highest priority and the oldest reception time, that is to say the time which is furthest in the past, is executed. That control command is also referred to as the currently executed control command.

Performing conflicting control commands is thus possible with an existing SCADA system which hitherto is designed for processing sequentially received control commands in their reception sequence by simple adaptation of the SCADA system. By storage of conflicting control commands and sorting, which is easy to implement, of the stored commands, a plurality of controllers (control units) accessing a wind turbine are thus given the option of accessing the wind turbine, wherein at the same time rudimentary functions of an operational management software are integrated in order suitably to avoid conflicting operating states of different wind turbines.

If accordingly a stop control command was sent for example by an energy network operator to all wind turbines of one or more wind farms then the controllers (control means) of the wind turbines stopped operation which for example includes transitioning into a spinning mode. Without the techniques described here, that stop command could be overwritten for example by another stop command in order for example to implement an environmental protection function. If then the stop command for implementing the environmental protection function were withdrawn the installation would be put into normal operation again even if the network operator would still have preferred stopping the wind turbine because of network instability.

In accordance with the new method all conflicting control commands are now stored in accordance with their sequence and as long as a conflicting command is not yet processed, for example by virtue of its priority or its reception time, it is stored for later execution. A conflicting mode of a plurality of wind turbines can thus be prevented for a large number of case-related configurations.

In a first embodiment a control abort command is associated with each stored control command. In the situation where a control abort command associated with a control command is received the associated control command is then deleted if it is stored for later execution. Alternatively the associated control command is terminated and deleted if that is executed at the time as the currently executed control command. In addition in the last-mentioned case the control command stored in the sequence as next to the currently executed control command is executed as the new currently executed control command.

A sequence of stored conflicting control commands is therefore processed successively in accordance with their priority and their reception time. In that case a change is made from a currently executed control command which is therefore at a first location in the sequence to the next control command as the currently executed control command when a control abort command in respect of the currently executed control command is received. Processing is effected for as long as there are still a plurality of conflicting control commands stored.

In addition a control command stored for later execution can also be removed by an associated control abort command from the sequence of the conflicting control command. In other words, a received control command which for example in the sequence is of a lesser priority than a currently executed control command can already be removed prior to its execution from the sequence by an associated control abort command so that it is never executed.

This ensures that a new control command cannot automatically overwrite a previously received control command but each control command has to be withdrawn by its associated control abort command. A defined state of the control means is thus provided at any time.

According to a further embodiment each stored control command has an identifier (PID) of a control device, by which the control command was received or which issued the control command. A priority is associated with each identifier so that the priority is detected on the basis of the identifier.

It is thus sufficient for the priority of the controllers (control devices) in an apparatus carrying out the method, for example a wind turbine controller (control means) or a wind farm controller (control means), to be stored for the control devices. The control device per se can accordingly issue a control command as previously, for example with an unchanged protocol. An identifier for a control command is in any case usual in ordinary SCADA systems or the protocols thereof and is therefore already transmitted nowadays. Thus in a simple fashion a priority can be taken from the identifier or it can be converted into a priority in the apparatus itself. Adaptation of message packets which are sent from a control device to an apparatus which carries out the method is therefore not necessary so that already existing systems can be easily adapted to the new method.

According to a further embodiment each stored control command has an identifier (PID) of a control device which issued the control command, wherein in the case of a received control command having an identifier which is identical to an identifier of a previously stored conflicting control command the priority and the reception time of the received control command are firstly detected similarly to the above-described procedure and the received control command is stored together with its priority and the reception time. Thereupon the sequence of the stored conflicting control commands is updated and the control command with the highest priority and the oldest reception time is executed. In accordance with this embodiment however in the situation where a sub-priority is associated with the received control command the sequence of the stored conflicting control commands with the same identifier is additionally produced or updated on the basis of a sub-priority. In the situation where the received control command does not have a sub-priority the previously stored conflicting control command which has the same identifier as the received control command is deleted.

This embodiment involves preventing that, when a control device sends a control command which is not compatible with a control command which was previously sent by the same control device then the previously sent control command is deleted, even if no control abort command for that command was received. In that respect it is assumed that the fact that a new control command is issued by a control device indicates that a previously issued control command is no longer to be pursued. It is therefore preferably only in that exception situation that the procedure involves refraining from deleting a control command without a control abort command.

In a further embodiment the control command is associated with one of a plurality of predefined control types. Control commands are detected as conflicting control commands if they are associated with the same control type and in particular are intended for the same wind turbine.

Control types are therefore defined, for which then a plurality of control commands are respectively defined. Conflicting control commands denote all control commands which are associated with the same control type. It is therefore possible in an easy fashion to ascertain whether a received control command does or does not conflict with one or more stored control commands. Accordingly for example in the apparatus which carries out the method, a list or table is generated and the control types are stored with the associated control commands. On the basis of that table it is then easily possible after the reception of a control command to check the control type with which the received control command is to be associated and whether control commands of that control type are already stored.

In a further embodiment each control command has one of at least three priorities. Control commands preferably have the highest priority when they are issued by a wind turbine manufacturer. Control commands further have a lowest priority when they are issued by the wind turbine operator. Control commands preferably have a priority which is between the lowest and the highest priority when they are issued by a control means controlling the wind turbine. Such division of the priorities is advantageous in order to be able to react to region-overarching global control commands in as near to real time as possible.

In a further embodiment control commands which have the lowest priority additionally have a sub-priority in order in the case of a plurality of operators to associate different sub-priorities with the plurality of operators. In that respect account is taken of the fact that, in the case of a plurality of operators, prioritization of the operators is also possible in regard to a control means.

In a further embodiment at least all control commands which serve to stop a wind turbine are associated with the same control type. Those control commands include in particular transferring the wind turbine into a state with the rotor completely stopped. Alternatively or additionally the control type includes the control command to transit the wind turbine into a spinning mode. Additionally or alternatively the control type includes the control command to change the wind turbine into a special operating mode or protection mode. The special operating mode or protection mode denotes in particular an animal protection mode, in particular a bat or bird protection mode involving a reduced and/or predefined maximum speed of the rotor. A further example of a special operating mode is a shadow casting mode for preventing predefined shadow casting by the rotor. It is particularly advantageous for those control commands to be combined in a control type and identified as stop commands as they are frequently demanded in conflicting relationship with a normal operating mode and a wind turbine can or may be operated in a prioritized fashion with only one of those control commands.

According to a further embodiment in the situation where no control command is stored in the memory, which is to be associated with the control type serving to stop a wind turbine, the wind turbine is not stopped but is operated. In that situation the wind turbine is operated in a predefined operating point or with a predefined operating curve, which is predetermined in particular by a control command of another control type. Alternatively or additionally the operating point or the operating curve corresponds to an operating mode or operating curve which was last executed, in particular prior to stopping.

This means that, as soon as all control commands which are to be associated with the control type serving to stop the wind turbine were cancelled by their control abort commands the wind turbine is automatically transferred again into an operating point, in particular an operating curve, and is operated in that operating point, in particular that operating curve.

According to a further embodiment the control command includes a target setting for operation of the wind turbine. The control command is then associated with a control type for operation of the wind turbine. Particularly preferably in accordance therewith all control commands which include a target setting for operation of the wind turbine are to be considered as conflicting control commands. In addition in particular the control commands which are associated with the control type for operation and control commands which are associated with the control type which serve to stop the wind turbine are conflicting control commands. The target setting of a control command includes in particular at least one of an active power target value, a reactive power target value, an apparent power target value, a voltage target value, a current target value or a phase angle target value.

Accordingly even conflicting control commands for operation of the wind turbine can be executed in succession or in prioritized relationship.

In addition provided is a computer program product. The computer program product includes instructions which, when executed on a computer (computing unit), in particular a control center, a cluster controller, a wind farm controller or a wind turbine control means, cause the computing unit to carry out the method according to one of the above-mentioned embodiments.

Provided is an apparatus for carrying out the method according to one of the above-mentioned embodiments. The apparatus is preferably a control center, a cluster controller, a wind farm controller or a wind turbine control means. The apparatus includes at least one data interface for connecting a plurality of control devices for receiving control commands and control abort commands.

According to a first embodiment of the apparatus it is in the form of a wind farm controller which can be connected to a plurality of wind turbines by way of a data connection and which has a memory (storage device) for storage of the control commands and is adapted to carry out the method according to one of the above-mentioned embodiments. In that respect the apparatus is adapted in particular to execute the control command having the highest priority and the oldest reception time as the currently executed control command, in which respect for that purpose current control commands can be transmitted by way of a data connection to a wind turbine associated with the control command.

According to a further embodiment of the apparatus it includes a memory having a plurality of memory regions, wherein each memory region is associated with precisely one of a plurality of wind turbines which can be connected to the apparatus. Preferably conflicting control commands can be stored in the memory region of a wind turbine. Particularly preferably each memory region is divided into a plurality of sub-memory regions, wherein each sub-memory region respectively stores all control commands of a control type in the case of conflicting received control commands. Thus each sub-memory region of a memory region of a wind turbine is associated with precisely one control type.

Furthermore, provided is a system having an apparatus according to one of the above-specified embodiments and a plurality of control apparatuses for generating control commands and control abort commands as well as a plurality of wind turbines for carrying out the control commands.

BRIEF DESCRIPTION OF THE SEVERAL VIEWS OF THE DRAWINGS

Further structures will be apparent from the embodiments by way of example described in greater detail with reference to the accompanying Figures in which.

DETAILED DESCRIPTION

Figure 1:
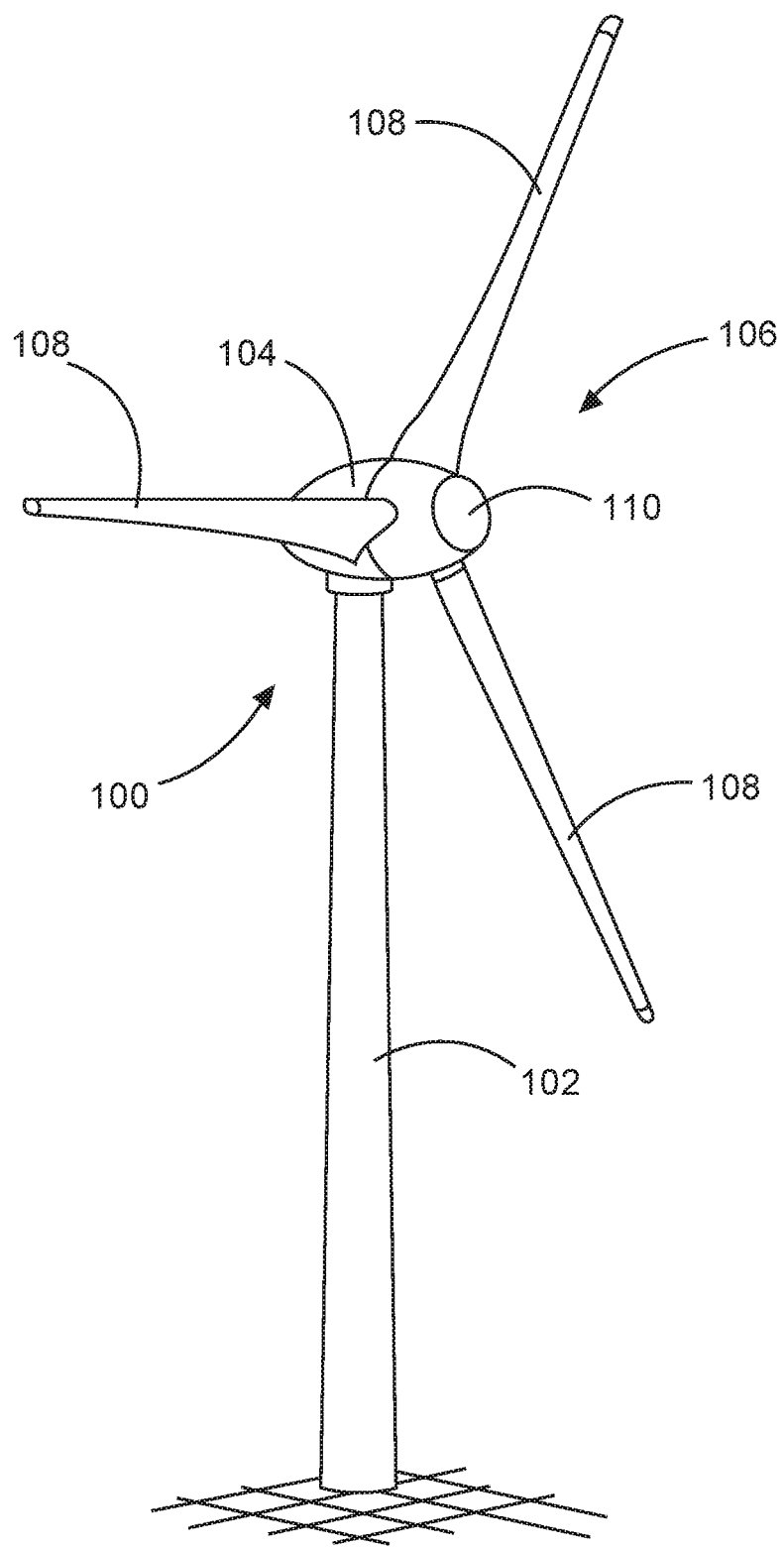
FIG. 1 shows a wind turbine.

FIG. 1 shows a diagrammatic view of a wind turbine 100 according to the disclosure. The wind turbine 100 has a tower 102 and a nacelle 104 on the tower 102. Provided on the nacelle 104 is an aerodynamic rotor 106 having three rotor blades 108 and a spinner 110. The aerodynamic rotor 106 is caused to rotate by the wind in operation of the wind turbine and thus also rotates an electrodynamic rotor or rotor member of a generator coupled directly or indirectly to the aerodynamic rotor 106. The electrical generator is arranged in the nacelle 104 and generates electric power. The pitch angles of the rotor blades 108 can be altered by pitch motors at the rotor blade roots of the respective rotor blades 108.

Figure 2:
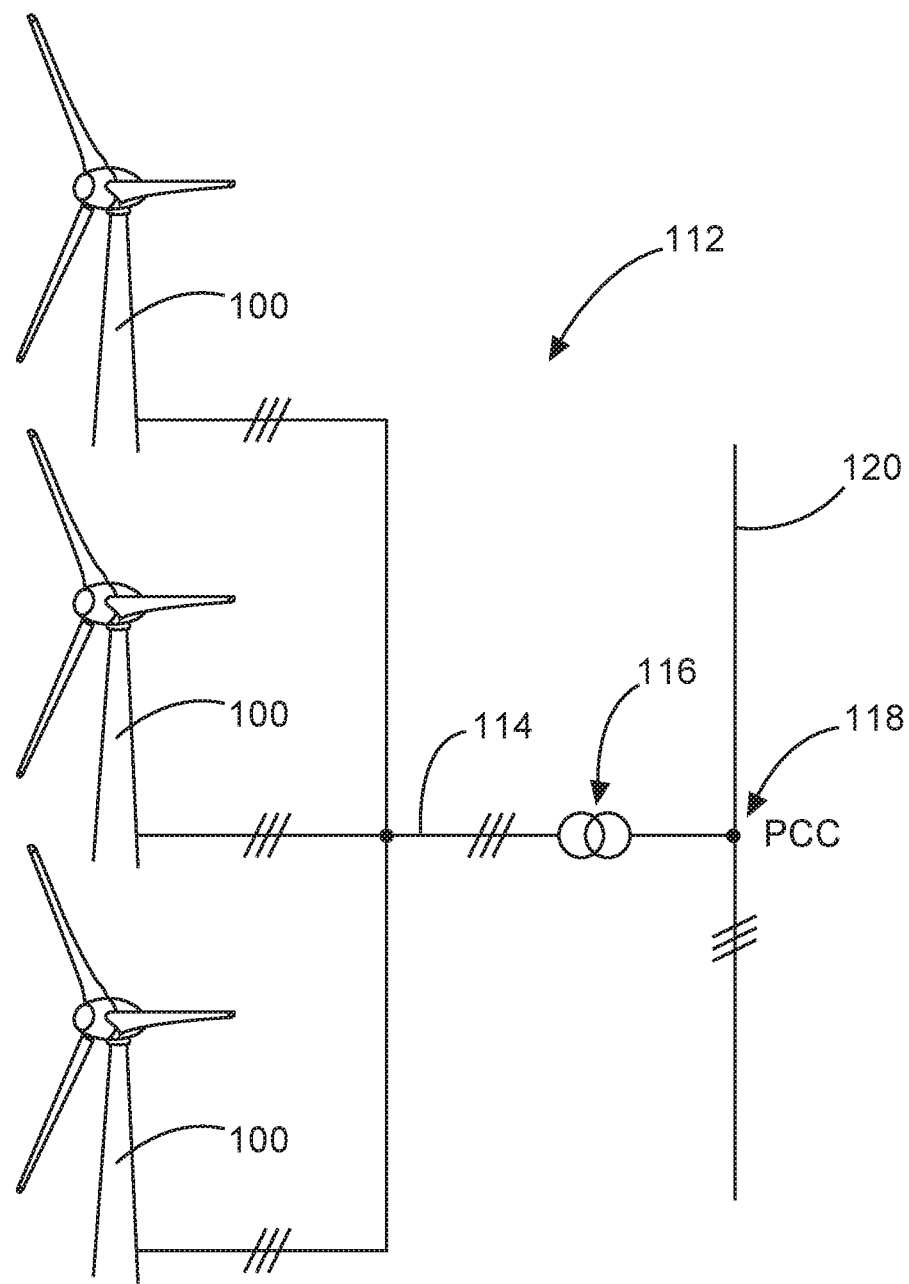
FIG. 2 shows a wind farm.

FIG. 2 shows a wind farm 112 with by way of example three wind turbines 100 which can be the same or different. The three wind turbines 100 are thus representative for basically any number of wind turbines of a wind farm 112. The wind turbines 100 provide their power, namely in particular the current generated, by way of an electrical farm network 114. In that respect the respectively generated currents or powers of the individual wind turbines 100 are added up and there is generally a transformer 116 which steps up the voltage in the farm in order then to feed it into the supply network 120 at the feed-in point 118 which is also generally identified as PCC. FIG. 2 is only a simplified view of a wind farm 112 which for example does not show any control means although naturally there is a control means. Also by way of example the farm network 114 can be of a different configuration by for example a transformer also being provided at the output of each wind turbine 100 in order to give just one other example of the structure.

Figure 3:
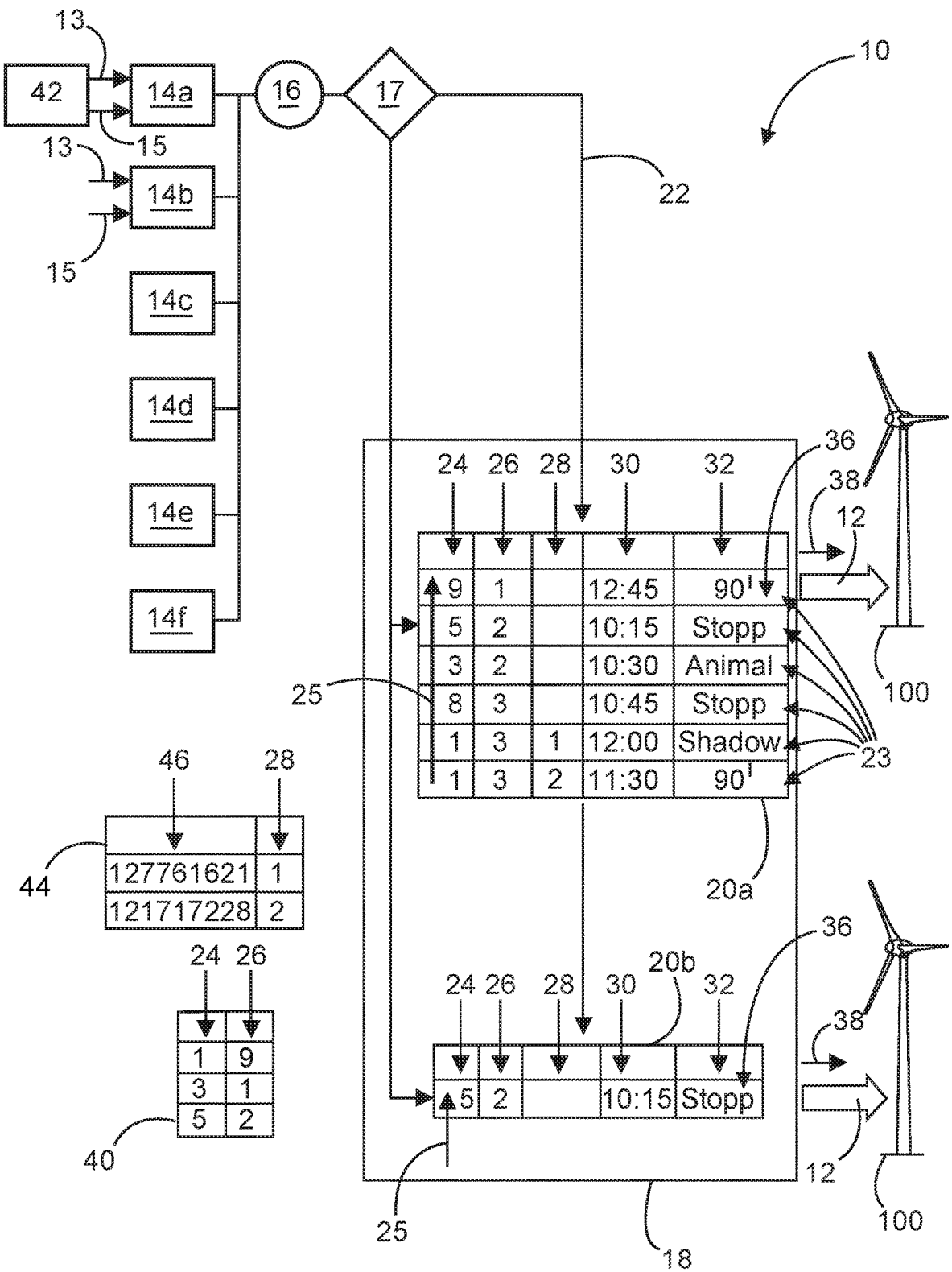
FIG. 3 shows a plurality of control apparatuses connected by way of a wind farm controller to a plurality of wind turbines.

FIG. 3 now shows the control means which is not shown in FIG. 2, with a wind farm controller 10 which is connected to a plurality of, here two, wind turbines 100 by way of a respective data line 12. The wind farm controller 10 includes a plurality of interfaces 14, by way of which control commands 13 and control abort commands 15 for the wind turbines 100 can be respectively received. The control commands 13 are passed by way of a computing unit 16 and an evaluation element 17 to a memory 18 for storage purposes while control abort commands 15 serve to delete memory entries.

In this embodiment by way of example only two memory regions 20a, 20b of the memory 18 are shown for the sake of better clarity, the memory regions respectively being associated with one of the wind turbines 100. The evaluation element 17 checks whether the received command 13, 15 is a control command 13 or a control abort command 15. The evaluation element 17 further checks to which of the wind turbines 100 the control command 13 or the control abort command 15 is directed or whether it applies to all wind turbines 100. In the case of a control command a check is also further made to ascertain whether that control command is a conflicting control command 22.

If the received control command 13 is a conflicting control command 22 the control command is then stored in a corresponding memory region or both of the memory regions 20a, 20b. The upper memory region 20a already stores a plurality of conflicting commands 23 which are all to be associated with a control type, serving for stopping the wind turbine, namely taking it out of operation.

The stored conflicting stored commands 23 are arranged in a sequence 25, wherein each stored conflicting control command 23 in a line is respectively stored together with an identifier 24, a priority 26, a sub-priority 28, a reception time 30 and an instruction to be executed of the control command, in one line. After a new conflicting control command 22 is received the sequence is sorted, having regard to the priority 26, the sub-priority 28 and the reception time 30, in such a way that the control command with the highest priority 26, possibly the highest sub-priority 28 and the oldest reception time 30 is arranged at the first position 36, here therefore being the uppermost location.

The control command 23 is then transmitted as a currently executed control command 38 to a wind turbine 100 to operate same with the control command 38.

The priority 26 is only shown here for improved clarity. In actual fact a list 40 is stored, which establishes the priority on the basis of the identifier 24. Each storage device 42 which transmits a control command to the wind farm controller 10 by way of the interface 14 is an identifier 24 which can then be converted by means of the table 40 into the priority 26 of the control command. A further table 44 additionally associates a sub-priority 28 with a client identification number 46 so that it is possible to associate with various users with different client identification numbers 46, on the basis of the client identification number 46, a sub-priority, in accordance with which the sequence 25 can then also be sorted.

Figure 4:
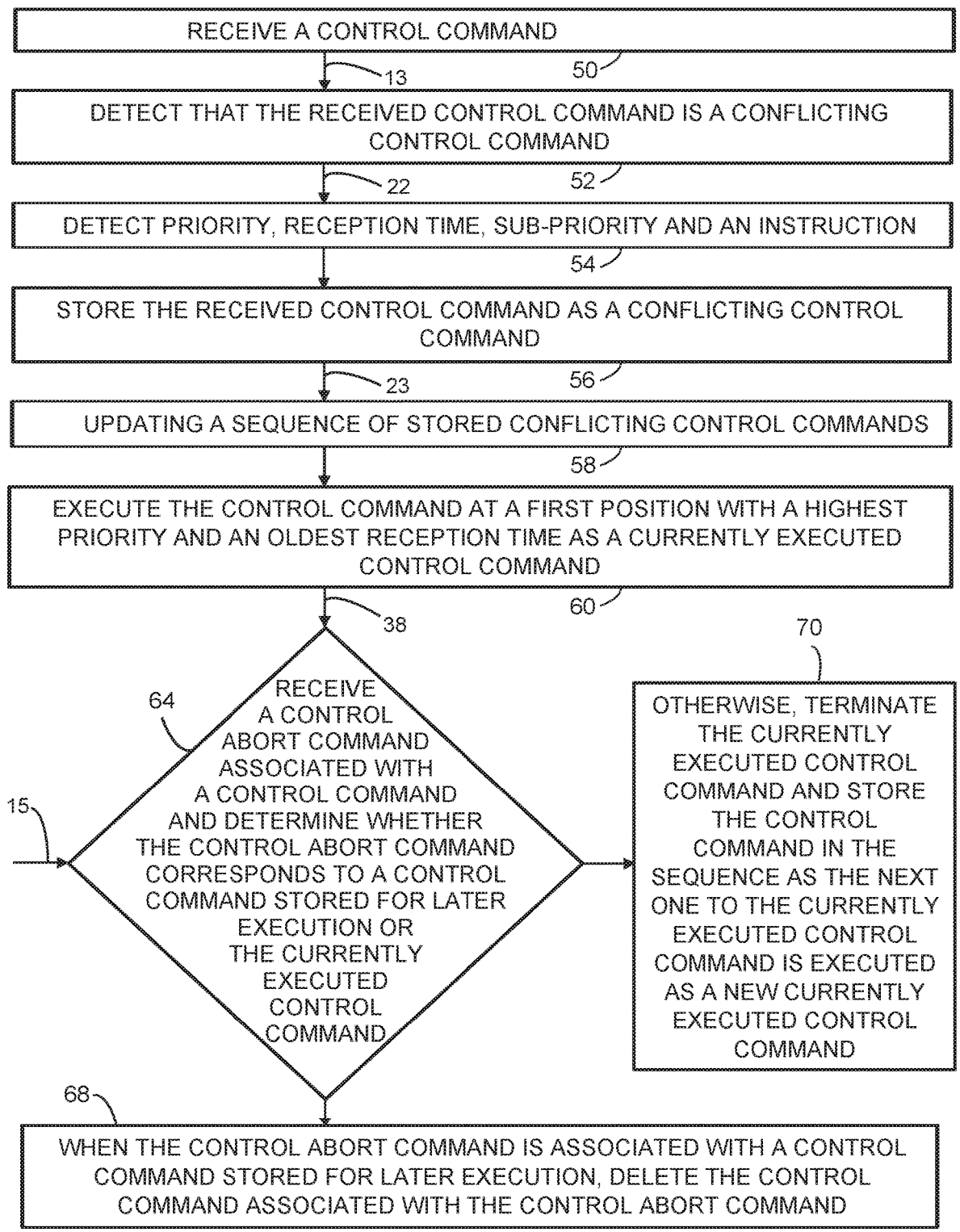
FIG. 4 shows the steps in the method.

FIG. 4 shows the steps in the method according to an embodiment by way of example. Firstly in a step 50 a control command 13 for a wind turbine 100 is received. Step 52 involves detecting that the received control command 13 is a conflicting control command 22, whereupon in step 54, a priority 26, a reception time 30, a sub-priority 28 and its instruction 32 to be carried out are detected. A step 56 involves storing the received conflicting control command 22 as a stored conflicting control command 23. In subsequent step 58 a sequence 25 of stored conflicting control commands 23 is updated. Finally in step 60 the control command at the first position 36 with the highest priority and the oldest reception time is executed as the currently executed control command 38.

Then in step 64 a control abort command 15 associated with a control command 22, 23, 38 is received and then at the same time step 64 involves checking whether the control abort command 15 corresponds to a control command 23 which is stored for later execution or the currently executed control command 38. In the situation where the control abort command 15 is associated with a control command 23 which is stored for later execution then the control command associated with the control abort command is deleted in step 68. Otherwise in step 70 the currently executed control command 38 is terminated and the control command 23 stored in the sequence 25 as the next one to the currently executed control command is executed as a new currently executed control command 38.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of controlling a wind turbine, comprising:
   receiving a control command for the wind turbine or another wind turbine of a plurality of wind turbines;
   determining that the received control command conflicts with at least one stored control command;
   detecting a priority and a reception time of the received control command;
   storing the received control command in a memory, as a stored control command, with the priority and the reception time;
   preparing or updating a sequence of stored conflicting control commands, the sequence depending on respective priorities and reception times of the stored conflicting control commands; and
   executing a stored control command of the sequence of stored conflicting control commands a highest priority and an oldest reception time as a currently executed control command.

2. The method according to claim 1 wherein a control abort command is associated with each stored control command and when the control abort command is received, the stored control command associated with the received control abort command:
   is deleted if a same control abort command is stored for later execution, or
   is terminated and deleted if it is being executed as the currently executed control command, wherein a stored command stored in the sequence as next to the currently executed control command is executed as a new currently executed control command.

3. The method according to claim 1 wherein each stored control command includes an identifier of a controller which issued the control command and a priority is associated with each identifier so that the priority is detected on the basis of the identifier.

4. The method according to claim 1 wherein:
   each stored control command includes an identifier of a controller which issued the control command and when the received control command has an identifier identical to an identifier of a previously stored conflicting control command, detecting the priority and the reception time of the received control command, storing the received control command, preparing or updating the sequence, and executing the stored control command are performed based on the identifier, wherein:
   when a sub-priority is associated with the received control command, a sequence of the stored conflicting control command with the same identifier is additionally created or updated based on the sub-priority; and
   when a sub-priority is not associated with the control command, the previously stored conflicting control command with the same identifier is deleted.

5. The method according to claim 1, wherein the received control command is associated with one or more predefined control types, wherein the received control command is determined to conflict with the at least one stored control command if the received control command and the at least one stored control command are associated with the same control type and are intended for the same wind turbine.

6. The method according to claim 1 wherein each control command has one of at least three priorities, wherein control commands have the highest priority if they are sent by a wind turbine manufacturer, the control commands have a lowest priority if they are sent by a wind turbine operator, and/or the control commands have a priority between the lowest and the highest priority when they are sent by a controller of the wind turbine.

7. The method according to claim 6 wherein the control commands having the lowest priority additionally have a sub-priority such that a plurality of operators have a plurality of different sub-priorities.

8. The method according to claim 1 wherein the control commands associated with the same control type that serves to stop the wind turbine if the control commands are for:
   transferring the wind turbine into a state with a completely stopped rotor; and/or
   transferring the wind turbine into a spinning mode; and/or
   transferring the wind turbine into a special operating mode or protection mode that include an animal protection mode, a bat or bird protection mode with a reduced and/or predefined maximum rotary speed of the rotor and/or a shadow casting mode for preventing predefined shadow casting of the rotor.

9. The method according to claim 8, wherein when no control command associated with the control type that serves to stop the wind turbine is stored, the wind turbine is operated in at operating point predetermined by a further control command or with a predetermined operating curve.

10. The method according to claim 1, wherein the control command is associated with a control type for operation of the wind turbine and the control command includes at least one target setting for operation of the wind turbine, wherein the at least one target setting includes at least one of:
    an active power target value,
    a reactive power target value,
    an apparent power target value,
    a voltage target value,
    a current target value, or
    a phase angle target value.

11. The method according to claim 10, wherein in the control commands associated with the control type for the operation of the wind turbine and control commands associated with a control type that serves to stop the wind turbine are conflicting control commands.

12. A computer-readable storage medium having stored thereon executable instructions that, when executed by a computer that is a control center, a cluster controller, a wind farm controller or a wind turbine controller, cause the computer to perform the method according to claim 1.

13. An apparatus for carrying out the method according to claim 1, wherein the apparatus is a control center, a cluster controller, a wind farm controller or a wind turbine controller of the wind turbine, and wherein the apparatus includes at least one data interface for connection to a plurality of controllers that generate the control commands and control abort commands.

14. The apparatus according to claim 13 wherein the apparatus is the wind farm controller, and the wind farm controller includes:
- at least one data connection configured to connect the wind farm controller to the plurality of wind turbines; and
- the memory configured to store the control commands, wherein the control command with the highest priority and the oldest reception time is selected as the currently executed control command and transmitted to the wind turbine associated with the control command by way of the at least one data connection.

15. The apparatus according to claim 14 wherein the memory has a plurality of memory regions, wherein each memory region is associated with one wind turbine which can be connected to the apparatus, wherein the conflicting control commands of the wind turbine are stored in a memory region of the plurality of memory regions associated with the wind turbine.

16. A system, comprising:
- the apparatus according to claim 13;
- the plurality of controllers for generating the control commands and the control abort commands; and
- the plurality of wind turbines for executing the control commands.

* * * * *